(12) United States Patent
Lin et al.

(10) Patent No.: US 11,440,659 B2
(45) Date of Patent: Sep. 13, 2022

(54) PRECISION AGRICULTURE IMPLEMENTATION METHOD BY UAV SYSTEMS AND ARTIFICIAL INTELLIGENCE IMAGE PROCESSING TECHNOLOGIES

(71) Applicants: Huan-Jung Lin, Yun-Lin (TW); I-Chang Yang, Yun-Lin (TW); Jie-Tong Zou, Yun-Lin (TW); Suming Chen, Yun-Lin (TW)

(72) Inventors: Huan-Jung Lin, Yun-Lin (TW); I-Chang Yang, Yun-Lin (TW); Jie-Tong Zou, Yun-Lin (TW); Suming Chen, Yun-Lin (TW)

(73) Assignee: National Formosa University, Yun-Lin Hsien (TW)

( * ) Notice: Subject to any disclaimer, the term of this patent is extended or adjusted under 35 U.S.C. 154(b) by 540 days.

(21) Appl. No.: 16/568,280

(22) Filed: Sep. 12, 2019

(65) Prior Publication Data
US 2021/0078706 A1    Mar. 18, 2021

(51) Int. Cl.
| | |
|---|---|
| *B64D 1/18* | (2006.01) |
| *B64D 47/08* | (2006.01) |
| *A01C 23/04* | (2006.01) |
| *A01M 7/00* | (2006.01) |
| *A01M 21/04* | (2006.01) |
| *B64C 39/02* | (2006.01) |

(Continued)

(52) U.S. Cl.
CPC .............. *B64D 1/18* (2013.01); *A01C 23/007* (2013.01); *A01C 23/047* (2013.01); *A01M 7/0042* (2013.01); *A01M 7/0089* (2013.01); *A01M 21/043* (2013.01); *B64C 39/024* (2013.01); *B64D 47/08* (2013.01); *G06V 20/188* (2022.01); *B64C 2201/027* (2013.01); *B64C 2201/12* (2013.01); *B64C 2201/141* (2013.01)

(58) Field of Classification Search
CPC ............ A01C 23/007; A01C 23/0047; A01M 7/0042; A01M 7/0089; A01M 21/043; B64C 39/024; B64C 2201/027; B64C 2201/12; B64C 2201/141; B64D 47/08
USPC .......................................................... 701/3
See application file for complete search history.

(56) References Cited

U.S. PATENT DOCUMENTS 9,804,604 B2 * 10/2017 Mattsson ............. G05D 1/0219
11,073,843 B2 *  7/2021 Kaechi ................. G06Q 50/02
(Continued)

*Primary Examiner* — Joshua E Rodden

(57) ABSTRACT

A precision agriculture implementation method by UAV systems and artificial intelligence image processing technologies provides an unmanned aerial vehicle (UAV), a wireless communication device, a central control unit, and a spray device and a multispectral camera installed to the UAV. The farming area is divided into an array of blocks. The central control unit controls the UAV to fly over the blocks according to navigation parameters and the multispectral camera to capture a multispectral image of each block. A projected leaf area index (PLAI) and a normalized difference vegetation index (NDVI) of each block are calculated by the multispectral image, and a spray control mode of the spray device of the corresponding block is set according to the PLAI and NDVI. The spray device is controlled to spray a water solution, salt solution, fertilizer solution, and/or pesticide solution to the corresponding block according to the spray control mode.

10 Claims, 10 Drawing Sheets

(51) Int. Cl.
 *A01C 23/00* (2006.01)
 *G06V 20/10* (2022.01)

(56) References Cited

U.S. PATENT DOCUMENTS

| | | | | |
|---|---|---|---|---|
| 11,181,516 | B2* | 11/2021 | Sutton | G06V 20/10 |
| 11,235,874 | B2* | 2/2022 | Jones | B64D 1/18 |
| 2005/0149235 | A1* | 7/2005 | Seal | A01B 79/005 |
| | | | | 382/110 |
| 2014/0303814 | A1* | 10/2014 | Burema | A01C 21/00 |
| | | | | 901/1 |
| 2016/0050840 | A1* | 2/2016 | Sauder | G06T 11/60 |
| | | | | 701/3 |
| 2016/0202227 | A1* | 7/2016 | Mathur | G06F 30/00 |
| | | | | 702/2 |
| 2017/0372137 | A1* | 12/2017 | Kumar | H04N 7/185 |
| 2020/0221681 | A1* | 7/2020 | Schwaderer | A01M 7/0089 |
| 2020/0242358 | A1* | 7/2020 | Hoffmann | A01B 79/005 |
| 2020/0386733 | A1* | 12/2020 | Nozaki | G01N 21/3563 |
| 2021/0027056 | A1* | 1/2021 | Koch | G06K 9/6256 |
| 2021/0027634 | A1* | 1/2021 | Li | B64C 39/024 |
| 2021/0182978 | A1* | 6/2021 | Nissing | A01B 79/02 |
| 2021/0365683 | A1* | 11/2021 | Badhwar | G06V 20/188 |
| 2021/0406539 | A1* | 12/2021 | Lo | G06V 20/20 |
| 2022/0019234 | A1* | 1/2022 | Birger | B05B 12/085 |

\* cited by examiner (a) NIR  (b) DI  (c) SR  (d) GNDI  (e) MSAVI

NDVI

X, Y: spatial dimension; Z: physiological and environmental Factor dimension (a)

(b)

PRECISION AGRICULTURE IMPLEMENTATION METHOD BY UAV SYSTEMS AND ARTIFICIAL INTELLIGENCE IMAGE PROCESSING TECHNOLOGIES

FIELD OF INVENTION

The present disclosure relates to a precision agriculture implementation method by UAV systems and artificial intelligence image processing technologies, in particular to a precision agriculture implementation technology that uses unmanned aerial vehicles to precisely control the timing of the irrigation and the spray of water solution/salt solution/fertilizer solution/pesticide solution required for the growth of crops.

BACKGROUND OF INVENTION

Description of the Related Art

In recent years, the use of an unmanned aerial system (UAS) for collecting, photographing, measuring and remote sensing data is highly anticipated by research organizations, companies, and related government departments. Compared with satellite vehicles and manned vehicles, the UAS has the advantages of low personnel operation risk, low operating cost, high efficiency, and high spatial resolution image capture. In the field of remote sensing, multispectral and hyperspectral cameras are indispensable sensors used for obtaining information of visible light (such as red light, green light, and blue light) and invisible light (such as red-edge and near infrared light), and the wavelengths of various photographed images can be used to derive over 70 vegetation indexes which are applicable to the areas of precision agriculture, vegetation survey, and disaster assessment, so that the UAS operated together with multispectral/hyperspectral cameras is definitely a solution for high-efficiency plant monitoring technologies.

The conventional precision agriculture implementation technology often uses unmanned aerial vehicles together with multispectral cameras to record multispectral images related to a large-area crop growth status in order to identify which part of a farming area needs special attention, so that the multispectral camera surely becomes a useful partner of the unmanned aerial vehicle. However, the multispectral camera using a megapixel-grade hyperspectral lens is expensive (approximately NTD 2,000,000) and heavy (over 1.5 Kg), and it further needs to suspend the unmanned aerial vehicle in air for approximately 7 seconds capture an image, so that the capture of images is inconvenient and the cost expenditure is too high.

To overcome the aforementioned drawback, European and American manufacturers have introduced a variety of unmanned aerial vehicles bundled with a relatively cheaper multispectral camera in recent years, and these unmanned aerial vehicles generally have 4~6 frequency bands, a weight approximately equal to 150 g, a convenient and fast capture of images similar to that of a RGB camera and the practical and price advantages, so that the unmanned aerial vehicle is the best vehicle applied in the precision agriculture. For example, a "Sequoia" multispectral camera has the RGB and near infrared lenses capable of covering four different spectral bands including a green light (with a wavelength of 500 nm), a red light (with a wavelength of 660 nm), a red-edge (with a wavelength of 735 nm) and a near infrared light (with a wavelength of 790 mn). The multispectral image has different reflection characteristics by using each spectral band of different objects and thus it is very convenient for resource surveys and environmental explorations.

Conventional unmanned aerial vehicles used for the purpose of agricultural implementation are disclosed in patents such as U.S. Pat. Publication No. 2017/0127606, U.S. Pat. No. 9,745,060, and World Intellectual Property Organization No. WO2018/000399, and these patents adopted remote unmanned aerial vehicles to carry out the agricultural irrigation, fertilization and pesticization, but did not disclose the technical characteristic of applying a software analysis of the multispectral image to precision agriculture, so that the aforementioned patents cannot precisely control the timing of the irrigation and the spray of the solution/salt solution/fertilizer solution/pesticide solution required for the growth of crops and cannot effectively overcome the issue of pesticide abuse, lower the agricultural planting cost, and improve the efficiency of the agricultural pest control.

In view of the aforementioned drawbacks of the prior art, the team of the present disclosure based on years of experience in the related industry to conduct extensive research and experiment, and finally developed a precision agriculture implementation method by UAV systems and artificial intelligence image processing technologies in accordance with the present disclosure to overcome the drawbacks of the prior art.

SUMMARY OF THE INVENTION

Therefore, it is a primary objective of the present disclosure to provide a precision agriculture implementation method by UAV systems and artificial intelligence image processing technologies to overcome the drawbacks of the prior art.

To achieve the aforementioned and other objectives, this disclosure provides a precision agriculture implementation method by UAV systems and artificial intelligence image processing technologies to more precisely control the timing of the irrigation and spray of water solution/salt solution/fertilizer solution/pesticide solution required by the growth of crops, so as to overcome the issue of pesticide abuse, lower the agricultural planting cost and improve the efficiency of the agricultural pest control. The technical measure taken by this disclosure is to provide an unmanned aerial vehicle, a wireless communication device, a central control unit and a spray device and a multispectral camera installed to the unmanned aerial vehicle. A farming area is divided into a plurality of blocks of an array. The central control unit controls the unmanned aerial vehicle according to navigation parameters to fly over the blocks sequentially and controls the multispectral camera to capture a multispectral image of each block, and the multispectral image calculates the projected leaf area index (PLAI) and normalized difference vegetation index (NDVI) of each block and then sets a spray control mode of the spray device corresponding to the block according to the projected leaf area index and the normalized difference vegetation index (NDVI) and controls the spray device to spray a water solution, a salt solution, a fertilizer solution, and/or a pesticide solution to the corresponding block according to the spray control mode.

DESCRIPTION OF THE PREFERRED EMBODIMENTS

Figure 1:
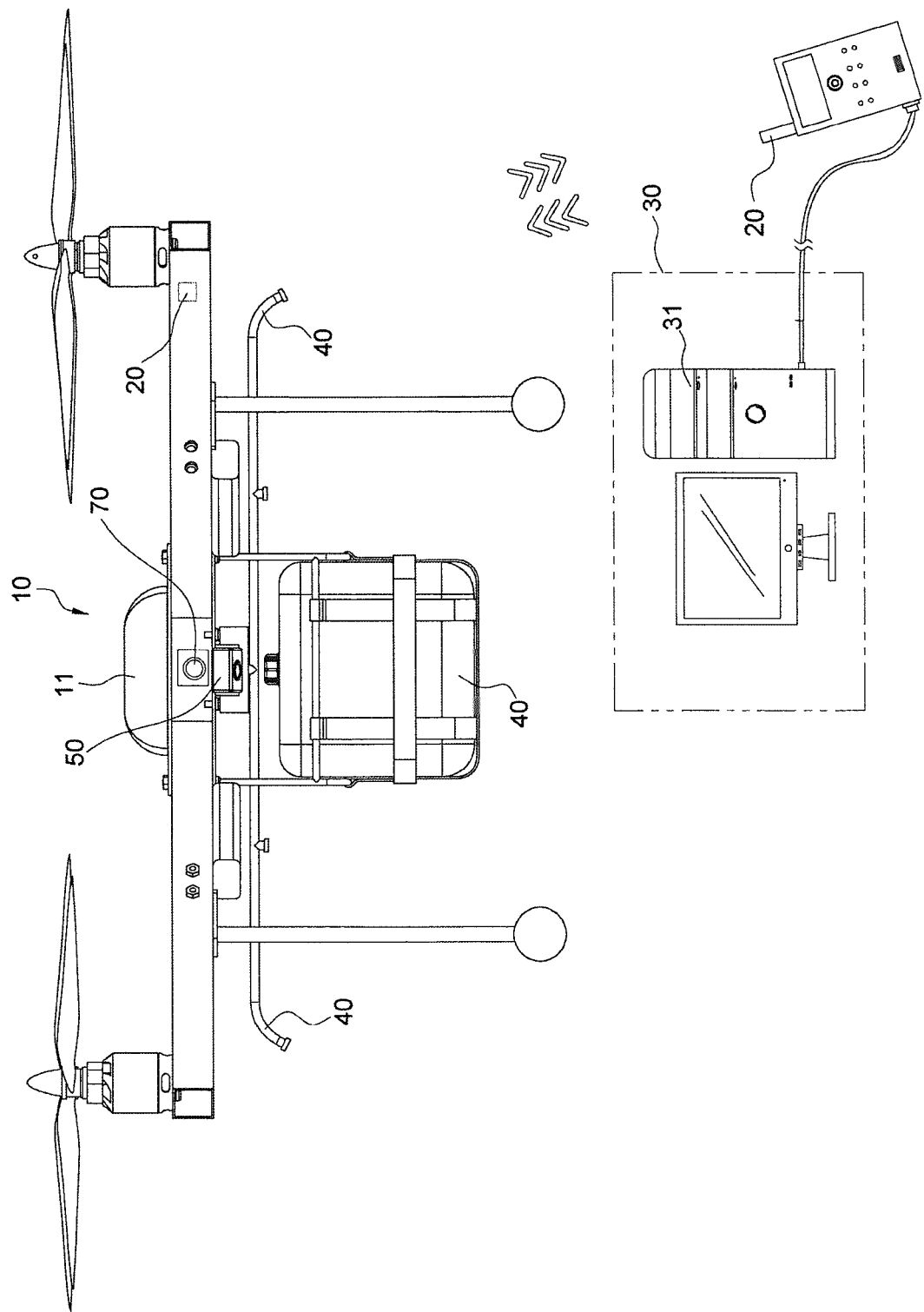
FIG. 1 is a schematic view showing the operation of an unmanned aerial vehicle of this disclosure.
Figure 2:
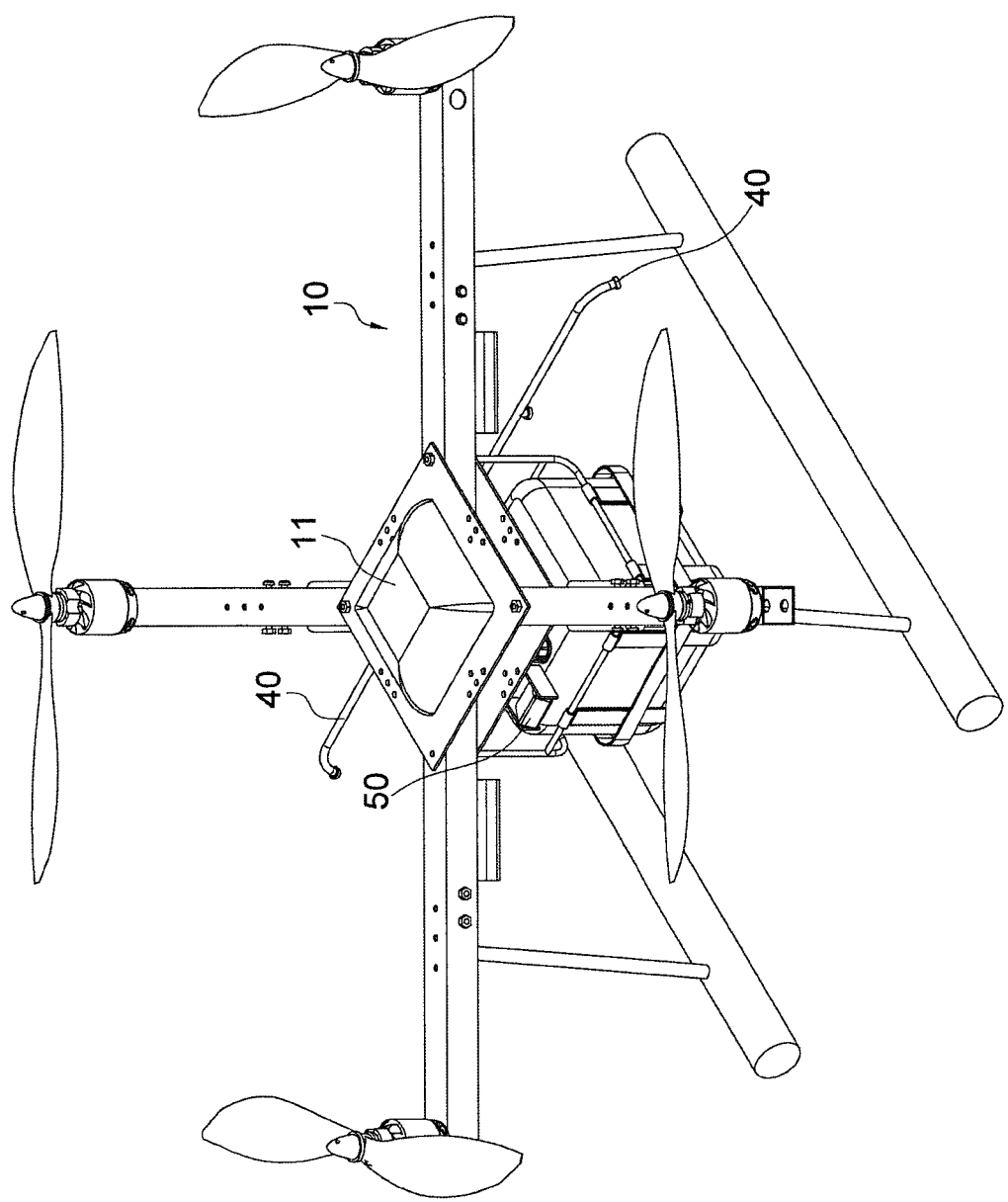
FIG. 2 is a schematic view showing an unmanned aerial vehicle that carries a spray device and a multispectral camera in accordance with a preferred embodiment of this disclosure.
Figure 3:
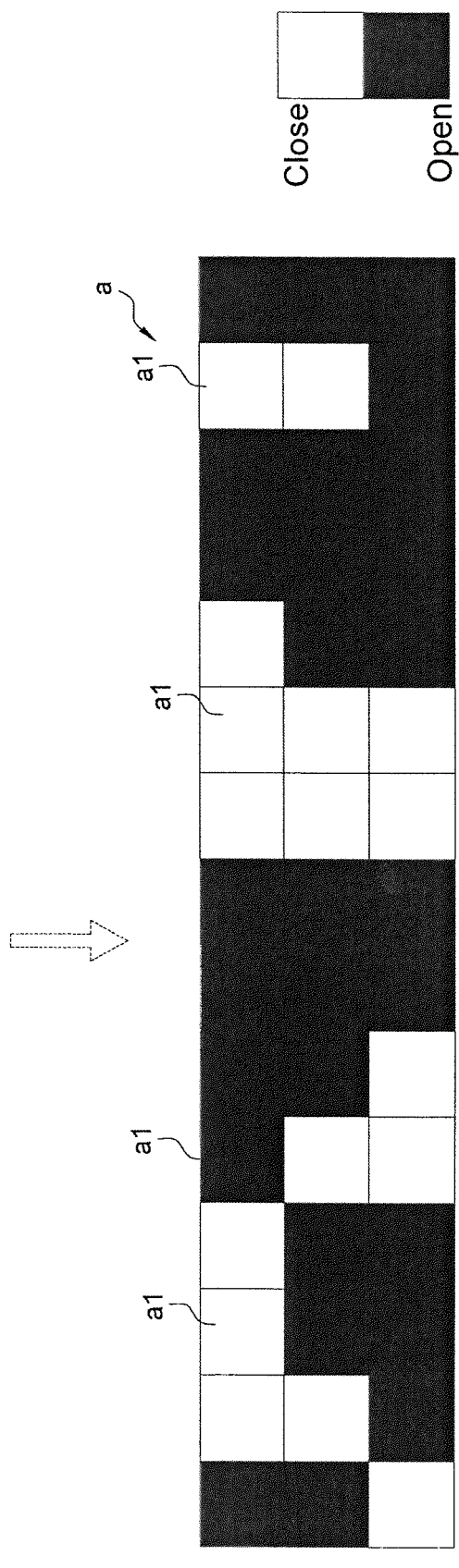
FIG. 3 is a schematic view showing the comparison between the spray ON/OFF control of a spray device and a block requiring irrigation in accordance with a preferred embodiment of this disclosure.
Figure 4:
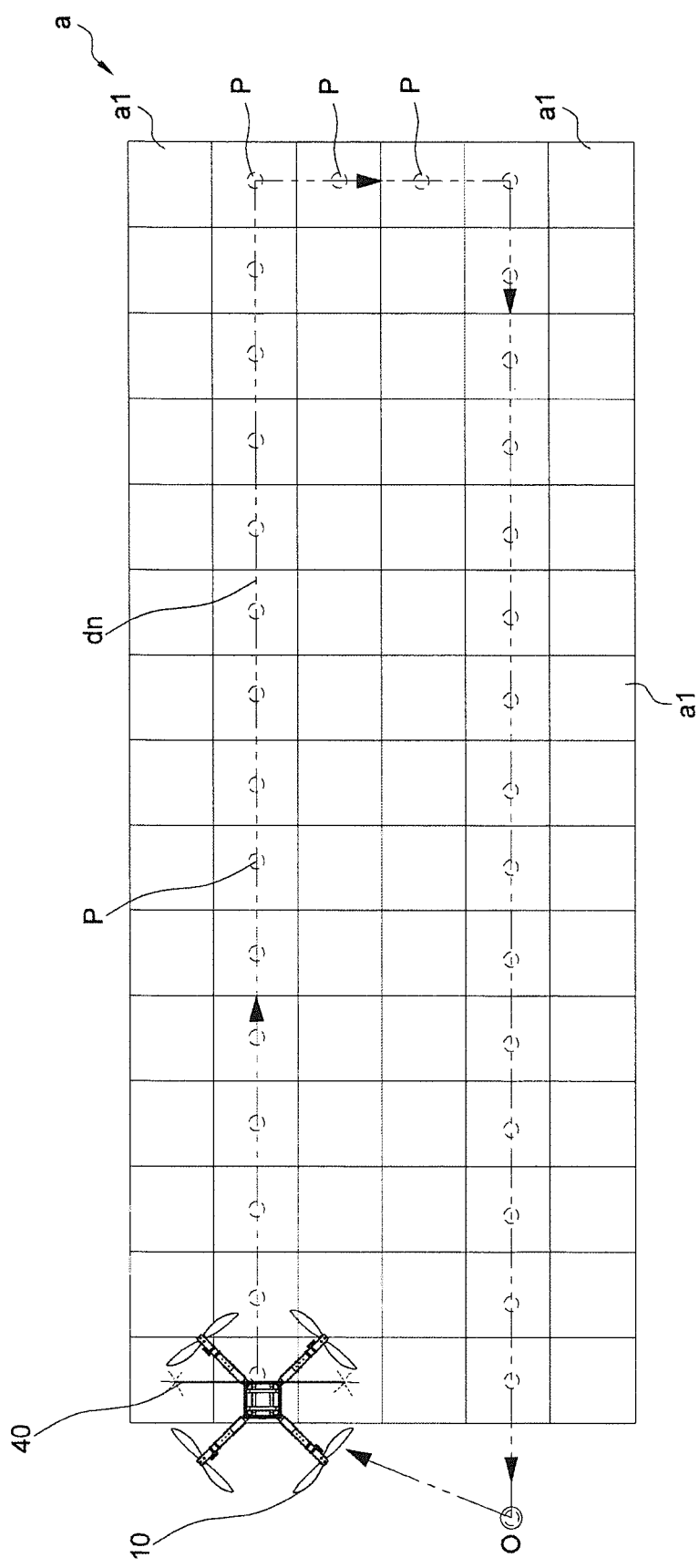
FIG. 4 is a schematic view showing an unmanned aerial vehicle that flies along a spraying flight path in accordance with a preferred embodiment of this disclosure.

To make it easier for our examiner to understand the technical content of the disclosure, we use preferred embodiments together with the attached drawings for the detailed description of the disclosure.

Figure 15:
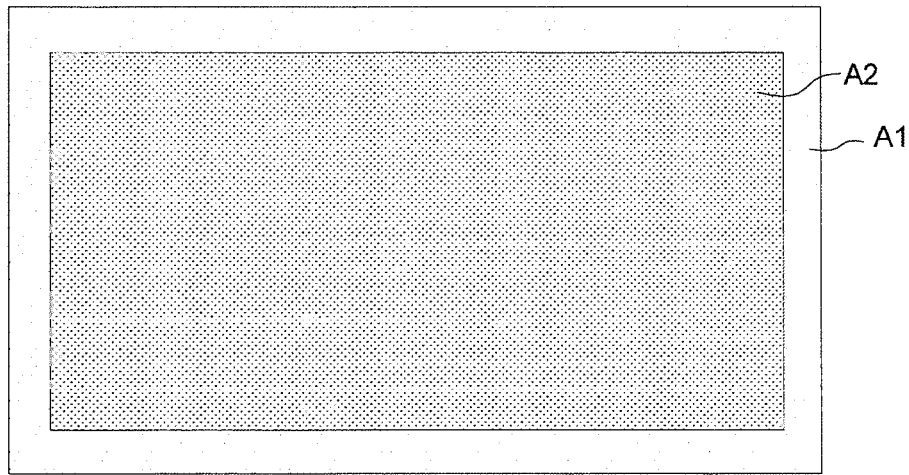
FIG. 15 is a schematic view of showing the variation of projected leaf area index, wherein (a) shows a distribution of the projected leaf area index greater than 0.85; and (b) shows a distribution of the projected leaf area index less than 0.85 in accordance with this disclosure.
Figure 15:
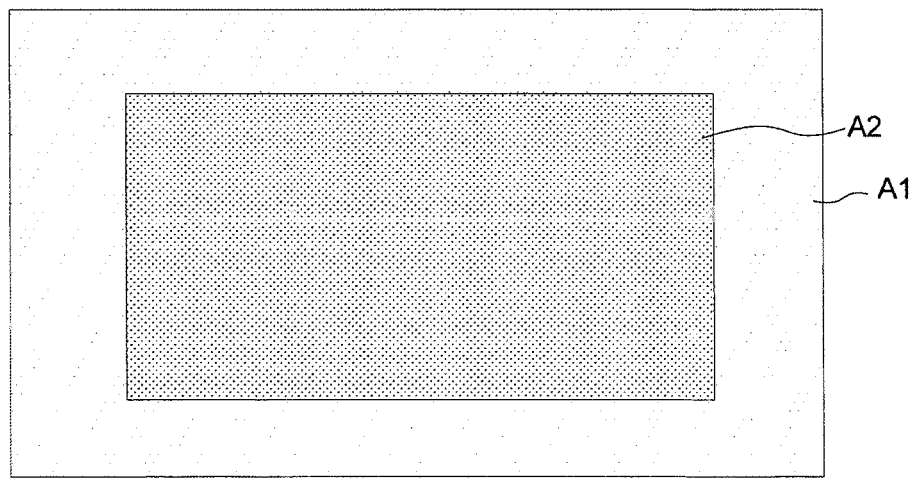

In FIGS. 1-4, the method of this disclosure comprises the following steps:

(a) providing an unmanned aerial vehicle 10, a wireless communication device 20 and a central control unit 30, wherein the unmanned aerial vehicle 10 is installed with a spray device 40 for spraying a water solution, a salt solution, a fertilizer solution, and/or a pesticide solution and a multispectral camera 50;

(b) dividing a farming area planted with a plurality of strains of plants into an array of a plurality of blocks a1, wherein each block a1 sets a plurality of navigation parameters including a center coordinate P and sets a flight path do according to the plurality of blocks a1 for the central control unit 30 to control the unmanned aerial vehicle 10; and the navigation parameters further include a serial number parameter, a speed parameter, a height parameter and an arrival time parameter of each block; and the central control unit 30 controls the unmanned aerial vehicle 10 fly according to the serial number parameter, the speed parameter, the height parameter and the arrival time parameter;

(c) controlling the unmanned aerial vehicle 10 by the central control unit 30 to fly over each block a1 of the farming area a according to the flight path and controlling the multispectral camera 50 to capture a multispectral images of each block a1 at least including a green light, red light, red-edge and near infrared light NIR;

(d) transmitting the navigation parameters and multispectral images of each block a1 to the central control unit 30 by a wireless communication device 20;

(e) performing an image processing of the multispectral images by a built-in image processing module 31 of the central control unit 30, and calculating each multispectral image according to a projected leaf area index formula and a normalized difference vegetation index (NDVI) formula to generate a projected leaf area index (PLAI) and a normalized difference vegetation index (NDVI) of each block a1, and then setting a spray control mode of the spray device 40 corresponding to the block a1 according to the projected leaf area index and the normalized difference vegetation index (NDVI), wherein projected leaf area index (PLAI)=total projected leaf area (A2)/plant area (A1) as shown in FIG. 15, and normalized difference vegetation index (NDVI)=(near infrared light reflection amount ρNIR−red light reflection amount ρRED)/(near infrared light reflection amount ρNIR+red light reflection amount ρRED); and (f) controlling the unmanned aerial vehicle 10 by the central control unit 30 to fly over the farming area a according to the flight path dn, and controlling the spray device 40 to spray a water solution, a salt solution, a fertilizer solution, and/or a pesticide solution to the corresponding block a1 according to the set spray control mode.

In a specific embodiment of this disclosure, the spray control mode comprises a spray valve for controlling the spray device 40 to be set to a full open control mode in a full open status. If the projected leaf area index is greater than or equal to 0.85 or the normalized difference vegetation index (NDVI) is greater than or equal to 0.75, then the spray control mode will be the full open control mode. Preferably, the spray control mode further comprises an open ratio control mode for controlling the spray valve to be opened to set to a predetermined ratio with respect to the full open status of the full open control mode; and if the projected leaf area index is smaller than 0.85 or the normalized difference vegetation index (NDVI) is smaller than 0.75, then the spray control mode will be the open ratio control mode, and the predetermined open ratio is equal to the projected leaf area index divided by 0.85 or the normalized difference vegetation index (NDVI) divided by 0.75.

In FIGS. 1~4, this disclosure preferably uses the central control unit 30 to control a short wave light source device 70 of the unmanned aerial vehicle 10 to illuminate each block a1 at night, so that the multispectral image of each block a1 captured by the multispectral camera 50 includes its fluorescent image. The central control unit 30 obtains a fluorescence index/intensity of a plant in each block a1 according to the fluorescent image captured by each block a1. If the fluorescence index/intensity is greater than a predetermined value, then the spray device 40 will be controlled to spray a water solution, a salt solution, a fertilizer solution, and/or a pesticide solution to the corresponding block a1 according to the set spray control mode. Wherein, the time for the multispectral camera 50 to capture the multispectral image of the block a1 is approximately 25~35 seconds (preferably 30 seconds). The image processing module 31 of the central control unit 30 converts the captured multispectral image into a fluorescence index and draws a contour map according to the numeral value of the fluorescence index to obtain the fluorescence index/intensity and difference at a position P of the block a1, so as to estimate the growth conditions of a crop when its physiological conditions suffer from adversity and use the estimate as a reference to adjust the spray amount of the water solution, salt solution, fertilizer solution and pesticide solution. Specifically, if the fluorescence index/intensity has a normalized fluorescence index/intensity greater than or equal to 0.3, then the spray device will be controlled to spray water solution to the block according to the spray control mode. The spray control mode includes a full open control mode for controlling a spray valve of the spray device to be set in a full open status. Preferably, if the normalized fluorescence index/intensity is greater than or equal to 0.4, then the spray device will be controlled to spray water solution to the block according to the spray control mode, and the spray control mode is the full open control mode. In addition, the central control unit 30 obtains a temperature value of each block a1 according to the captured multispectral image; and if the temperature value is greater than a predetermined temperature value, then the spray device will be controlled to spray water solution to the block a1 according to the spray control mode.

In this disclosure, the fluorescence index is used to estimate the adversity of water, nutrition, temperature, salinity, bacterial infection or pest of the plant. Specifically, the central control unit 30 bases on the fluorescence index/intensity to determine the water shortage, fertilization shortage, salt shortage or pest condition of the plurality of strains of plants of each block a1. If the fluorescence index/intensity is greater than or equal to the predetermined value, then the spray device 40 will be controlled to spray a water solution, a salt solution, a fertilizer solution, and/or a pesticide solution to the block a1 according to the spray control mode.

In FIGS. 1~4, the navigation parameters of the unmanned aerial vehicle 10 include a serial number parameter, a speed parameter (wherein a speed sensor can be used to confirm a speed, a height parameter (wherein a height sensor can be used to confirm a height), a center coordinate parameter (wherein a GPS can be used to confirm a position) and an arrival time parameter of each block a1.

Figure 5:
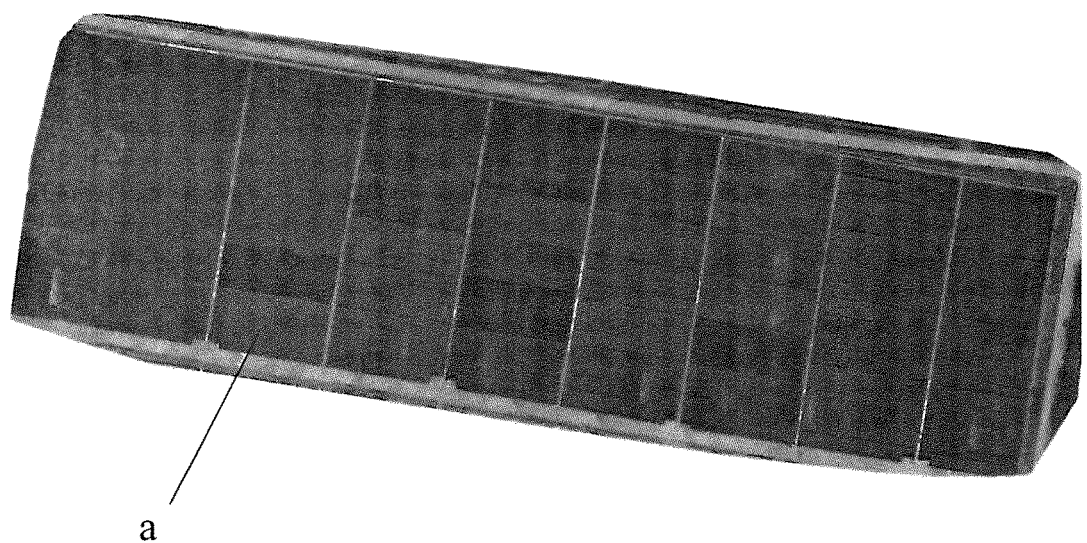
FIG. 5 is a schematic view showing a RGB spectral image puzzle in accordance with a preferred embodiment of this disclosure.
Figure 6:
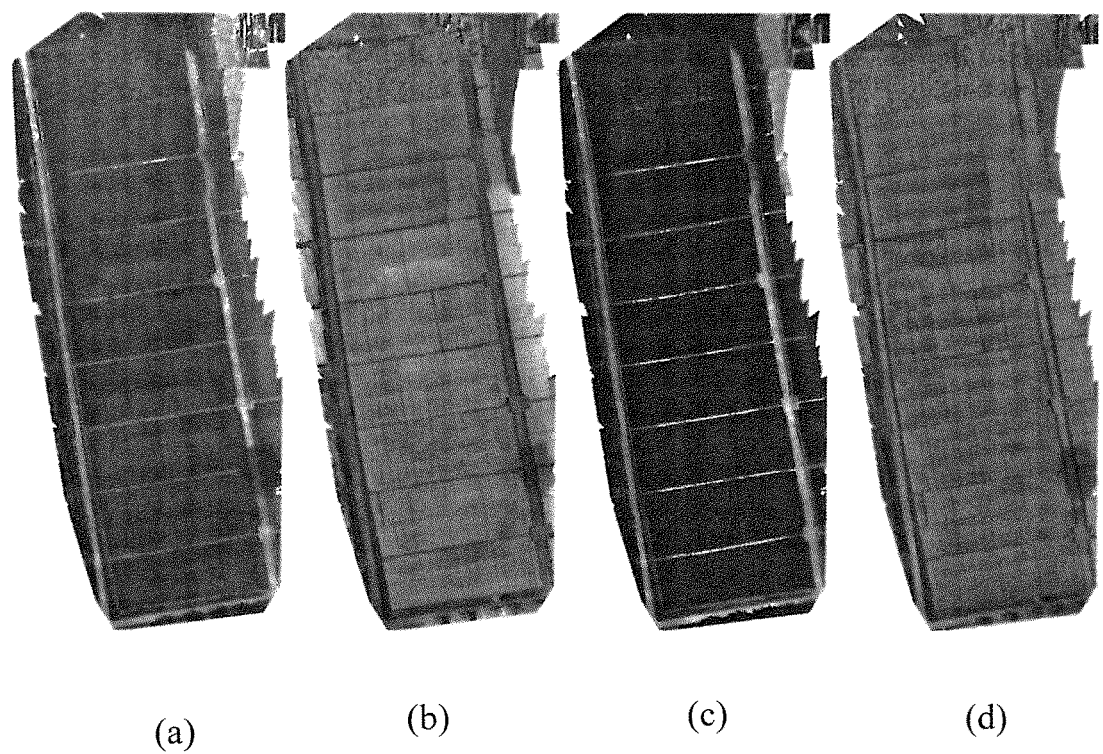
FIG. 6 shows multispectral image puzzles including: (a) a green light, (b) a red light, (c) a red-edge and (d) a near infrared light (from left to right) in accordance with this disclosure.
Figure 7:
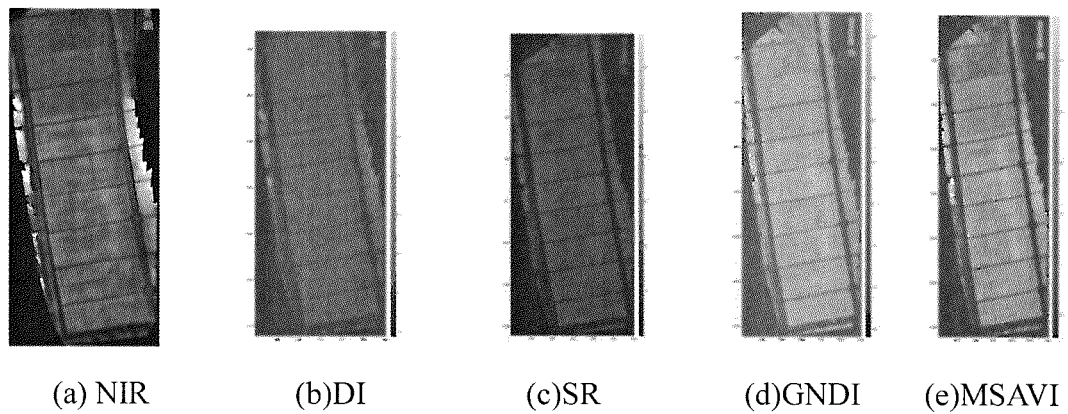
FIG. 7 shows (a) a NIR image puzzle of this disclosure; (b) a DIimage puzzle of this disclosure; (c) a SR image puzzle of this disclosure; (d) a GNDIimage puzzle of this disclosure; and (e) a MSAVIimage puzzle of this disclosure in accordance with a preferred embodiment of this disclosure.

Before the unmanned aerial vehicle 10 flies, the left-and-right and front-and-rear overlap rates of adjacent multispectral images of the multispectral camera 50 may be preset, and each multispectral image photographed and captured by the multispectral camera 50 records data such as the GPS center coordinate position, height, shooting gesture of each block a1. A larger complete figure of the multispectral image can be produced by a built-in puzzle software program of the image processing module 31 according to different spectra. With reference to FIG. 5 for the schematic view of the puzzle produced by the RGB spectra and FIGS. 6 (a), (b), (c) and (d) for the schematic views of the puzzle of the multispectral image of a green light, a red light, a red-edge and a near infrared light respectively, the vegetation index of the images of the aforementioned different spectra of each block can be calculated by the formula as shown in Table 1. FIG. 7(a) shows a near infrared light (NIR) spectral image splicing result of an aerial short of rice. FIG. 7(b) shows a difference index (D1) of the vegetation index image calculated by using the near infrared light spectral (NIR) image and green light image. In a multispectral image of a crop, the intensity of infrared light minus the intensity of a visible light (red light) is equal to the Difference Vegetation Index (DVI), and the DVI is divided by the intensity of the infrared light plus the intensity of the visible light (red light) is equal to the Normalized Difference Vegetation Index (NDVI). FIG. 7(c) shows a simple ratio (SR) image puzzle. FIG. 7(d) shows a Green Normalized difference Vegetation Index (GNDVI) image puzzle. FIG. 7(e) shows a modified soil adjusted vegetation index (MSAVI) image puzzle.

TABLE 1

| 名稱 | 縮寫 | 名稱 | 年份 |
| --- | --- | --- | --- |
| Burned area index | BAI | $1/((0.1 + R_{red})^2 + (0.06 + R_{nir})^2)$ | 2002 |
| Difference index | DI | $R_{800} - R_{550}$ | 2000 |
| Difference VI | DVI | $R_{800} - R_{680}$ | 2000 |
| Green normalized difference VI | GNDVI | $(R_{800} - R_{550})/(R_{800} + R_{550})$ | 2009 |
| Green red VI | GRVI | $(R_{green} - R_{red})/(R_{green} + R_{red})$ | 1979 |
| Modified green red VI | MGRVI | $(R_{green}^2 - R_{red}^2)/(R_{green}^2 + R_{red}^2)$ | 2015 |
| Modified soil adjusted VI | MSAVI | $0.5(2R_{800} + 1 - \sqrt{(2R_{800} + 1)^2 - 8(R_{800} - R_{670})}$ | 2007 |
| Modified transformed VI | MTVI | $1.2 \cdot (1.2(R_{800} - R_{550}) - 2.5(R_{670} - R_{550}))$ | 2017 |
| Normalized difference Index | NDI | $(R_{800} - R_{680})/(R_{800} + R_{680})$ | 2015 |
| Normalized difference VI 3 | $NDVI_3$ | $(R_{780} - R_{550})/(R_{780} + R_{550})$ | 2014 |
| Optimal soil adjusted VI | $OSAVI^{[780, 550]}$ | $(1 + 0.16) \cdot (R_{800} - R_{670})/(R_{800} + R_{670} + 0.16)$ | 2007 |
| Re-normalized difference VI | RDVI | $(R_{800} - R_{670})/\sqrt{R_{800} + R_{670}}$ | 2003 |
| Soil adjusted VI | SAVI | $(1 + 0.5) \cdot (R_{nir} - R_{red})/(R_{nir} + R_{red} + 0.5)$ | 1988 |
| Simple Ratio 6 | SR | $R_{801}/R_{670}$ | 2004 |
| Transformed VI | TVI | $0.5 \cdot (120(R_{750} - R_{550}) - 200(R_{670} - R_{550}))$ | 2004 |
| Wide dynamic range VI | WDRVI | $(\alpha R_{nir} - R_{red})/(\alpha R_{nir} + R_{red})$ | 1998 |

Figure 8:
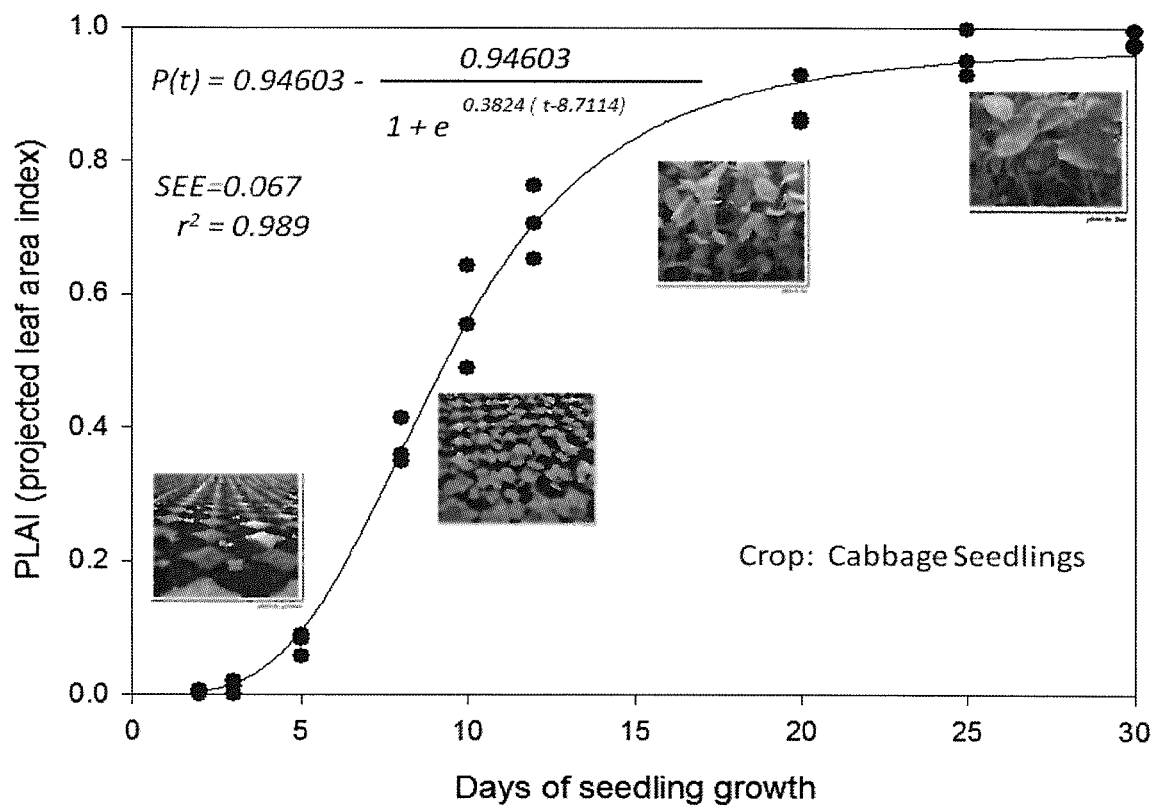
FIG. 8 shows a growth curve comparing the projected leaf area index and the number of days of seedling growth in accordance with this disclosure.

The leaf is a main organ for photosynthesis, respiration, transpiration, carbon cycling, and rainfall interception of a plant, and a leaf area is the most effective measuring item of the crop production potential in the study of crop physiology and agricultural research. The change and size of a leaf area shows the level of the crop growth and development, and the interception ability of light, which are important characteristics for the analysis of crop growths. FIG. 8 is a schematic view showing the growth curve comparing the projected leaf area index and the number of days of seedling growth in accordance this disclosure.

The normalized difference vegetation index (NDVI) is used for analyzing information obtained from remote sensing and observation to evaluate the growth status of green vegetation in a target area. The reflection amount ρRED and the reflection amount ρNIR of the near infrared light are capable of showing the information such as the growth of plants, and the vitality and productivity of the. A large numerical value means a high plant growth.

In this disclosure, the following three environmental conditions including the temperature, relative humidity and lighting condition of the plant in each block are also measured to improve the uniformity of these environmental conditions, learn the growth conditions of the plant, and implement the site-specific cultivation.

Figure 9:
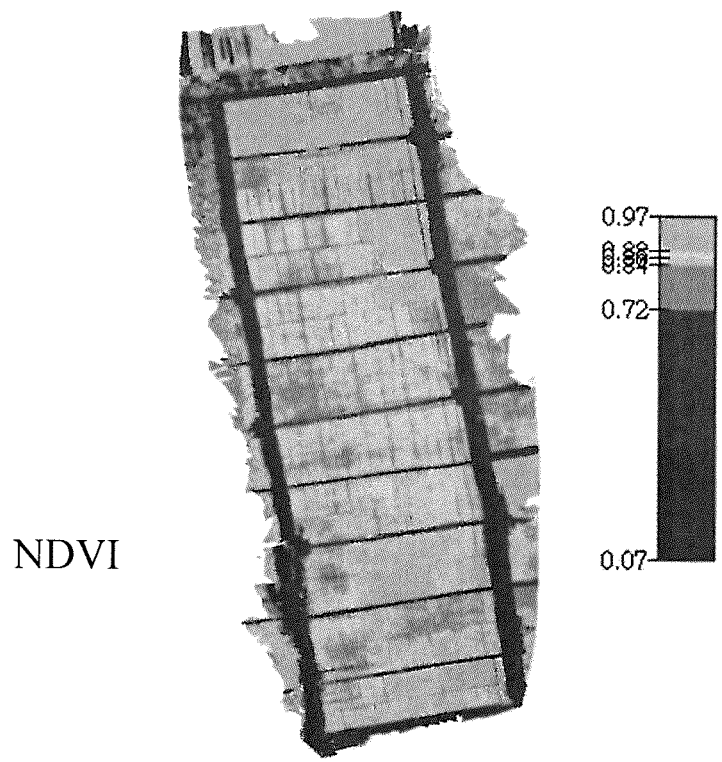
FIG. 9 shows a growth status of the normalized difference vegetation index (NDVI) in accordance with this disclosure.
Figure 10:
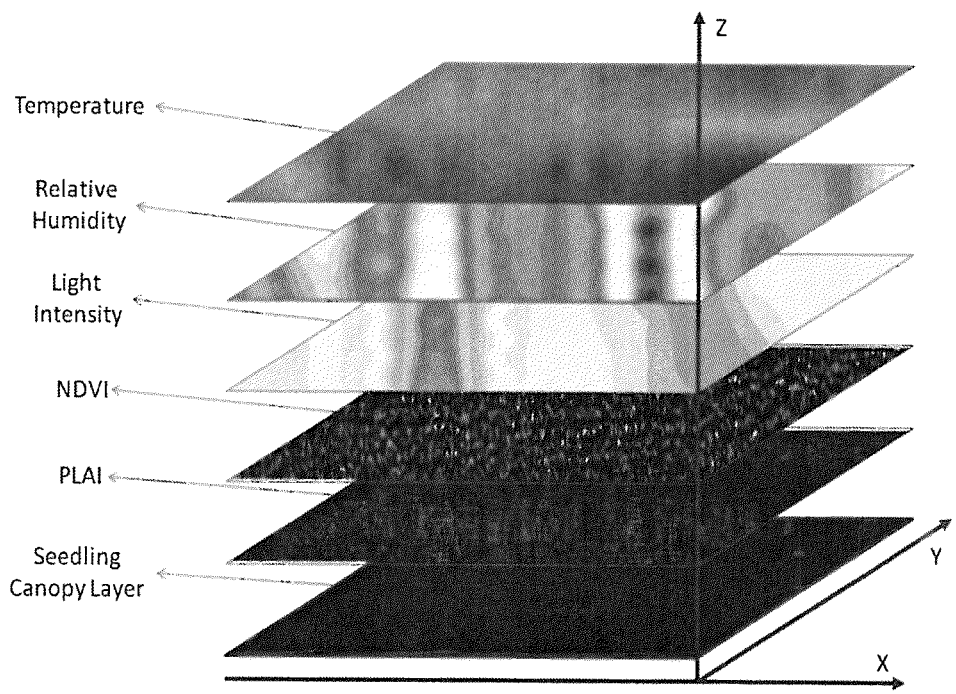
FIG. 10 shows a control analysis of seedling growth status with a plurality of environmental factors, NDVI and PLAI indexes in accordance with this disclosure.
Figure 11:
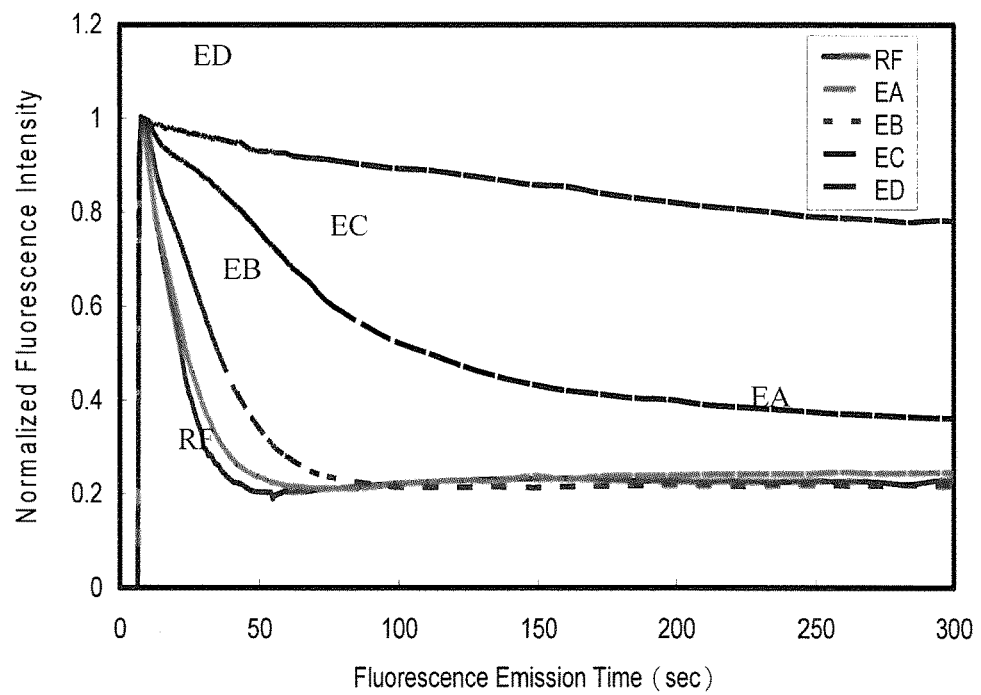
FIG. 11 shows a control curve of fluorescence intensity and fluorescence emission time in accordance with this disclosure.

FIG. 9 shows a growth status of the normalized difference vegetation index (NDVI) in accordance with this disclosure; and FIG. 10 shows a control analysis of seedling growth status with a plurality of environmental factors, NDVI and PLAI indexes in accordance with this disclosure In FIG. 11, the curves RF, EA, EB, EC and ED show the fluorescence intensity of a plant processed with the conditions of normal watering, one day without water, two days without water, three days without water, and four days without water respectively, Groups EA and EB have the chance of recovery before the plant is wilted permanently, but the curves of EC and ED show that the crops are short of water and difficult to recover.

Figure 12:
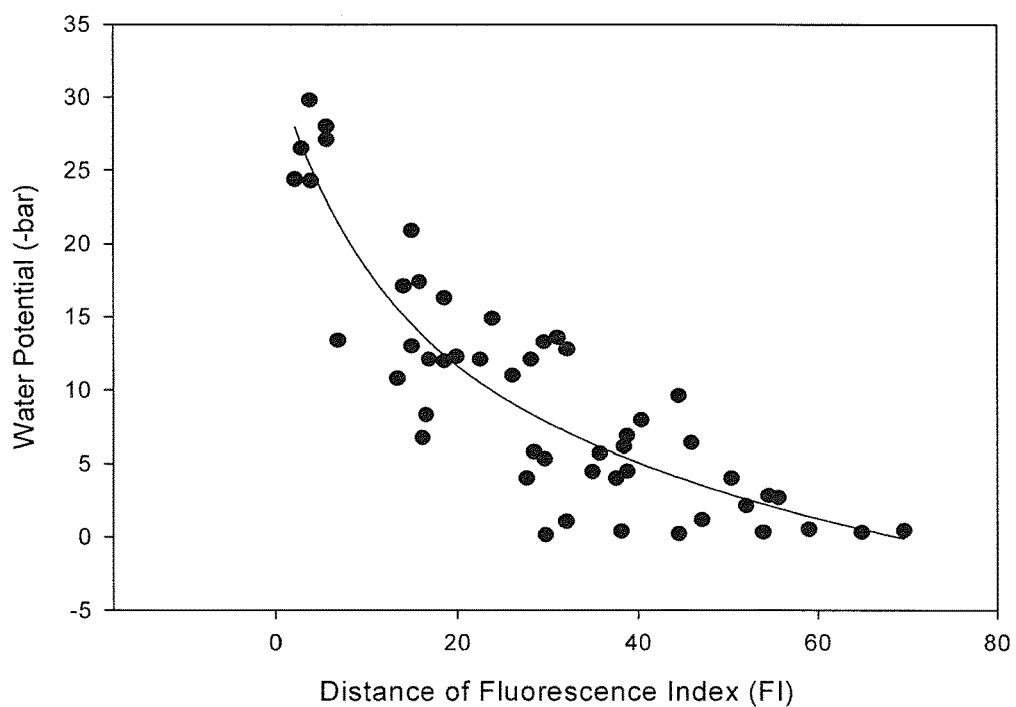
FIG. 12 shows a control curve of moisture potential and fluorescence index in accordance with this disclosure.
Figure 13:
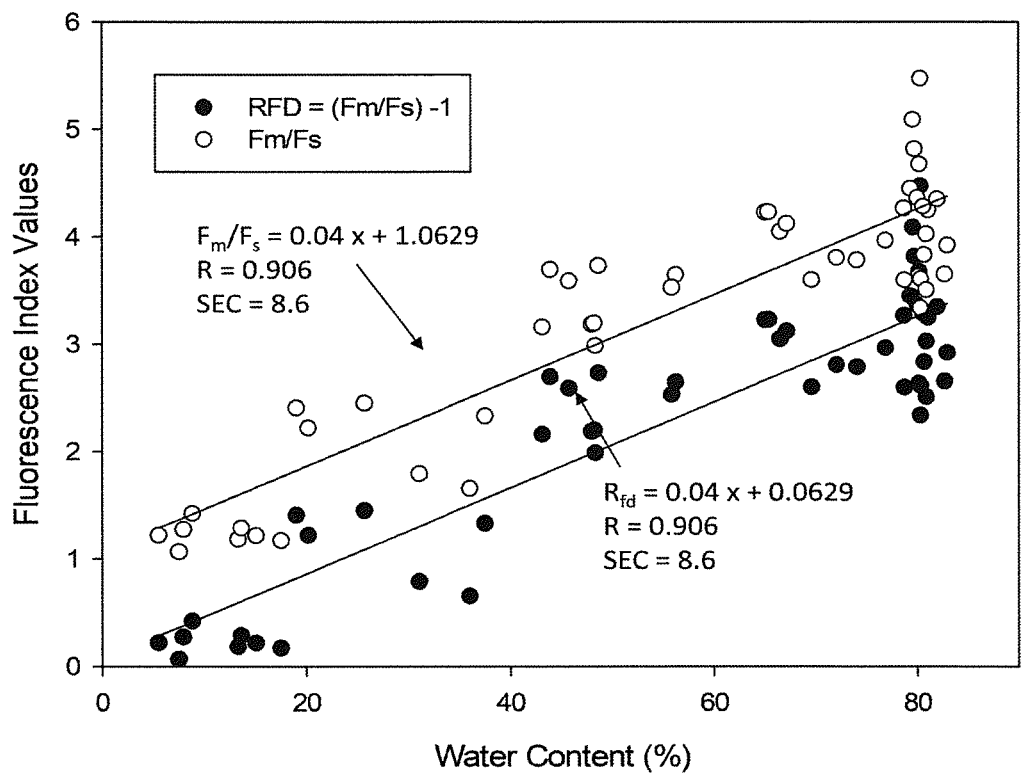
FIG. 13 shows a control curve of fluorescence index and water content in accordance with this disclosure.
Figure 14:
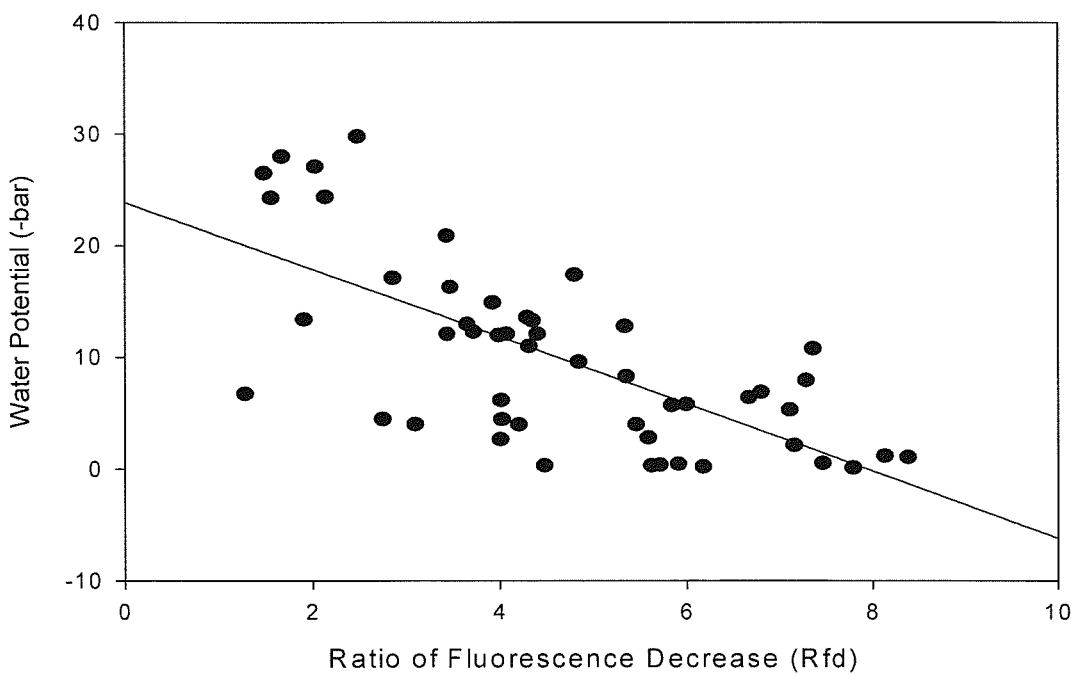
FIG. 14 shows a control curve of moisture potential and fluorescence drop rate in accordance with this disclosure.

With reference to FIG. 12 for a curve of fluorescence index versus moisture potential, it serves as a basis and a scientific evidence of the conversion of the fluorescent image into moisture management. This regression curve can be used as a basis for the scientific index of an unmanned aerial vehicle fluorescent image system. In FIG. 13, the data used in a conventional fluorescence test are RFD which is defined as (Fm/Fs)−1, which is the ratio of the maximum of the fluorescence curve to the steady state value minus one, so that a regression analysis of the data of the conventional fluorescence test is performed with the moisture content of the leaf, and the result may have a relatively large standard error, and thus the use of an online unmanned aerial vehicle fluorescent image system. With reference to FIG. 14, the regression analyses of the fluorescence index and the moisture potential of the crop in the conventional plant physiology research are divergent without any convergence, so that it is not suitable for the online unmanned aerial vehicle fluorescent image system.

FIG. 15(a) is a schematic view showing a distribution of the projected leaf area index greater than 0.85; and FIG. 15(b) is a schematic view showing a distribution of the projected leaf area index less than 0.85 in accordance with this disclosure.

What is claimed is:

1. A precision agriculture implementation method by UAV systems and artificial intelligence image processing technologies, comprising the steps of:
   (a) providing an unmanned aerial vehicle, a wireless communication device and a central control unit, wherein the unmanned aerial vehicle is installed with a spray device for spraying a water solution, a salt solution, a fertilizer solution, and/or a pesticide solution, and a multispectral camera;
   (b) dividing a farming area planted with a plurality of strains of plants into an array of a plurality of blocks, wherein each block sets a plurality of navigation parameters including a center coordinate, and the central control unit set a flight path for controlling the unmanned aerial vehicle according to the navigation parameters of the plurality of blocks;
   (c) controlling the unmanned aerial vehicle by the central control unit according to the flight path to sequentially fly over each block of the farming area, and controlling the multispectral camera to capture a multispectral image of each block which at least includes a green light, a red light, a red-edge and a near infrared light;
   (d) transmitting the navigation parameters and the multispectral image of each block to the central control unit through the wireless communication device by the unmanned aerial vehicle;
   (e) processing the multispectral image by the central control unit, calculating a projected leaf area index (PLAI) and a normalized difference vegetation index (NDVI) by the multispectral image, and then setting a spray control mode of the spray device corresponding to the block according to the projected leaf area index and the normalized difference vegetation index (NDVI); wherein the projected leaf area index=the total projected leaf area of the plant/the plant area; the normalized difference vegetation index (NDVI)=(near infrared light reflection amount ρNIR−red light reflection amount ρRED)/(near infrared light reflection amount ρNIR+red light reflection amount ρRED); and
   (f) controlling the unmanned aerial vehicle by the central control unit to fly over the farming area sequentially according to the flight path and controlling the spray device to spray the water solution, salt solution, fertilizer solution, and/or pesticide solution to the block according to the spray control mode.

2. The method as claimed in claim 1, wherein the spray control mode includes a full open control mode for controlling a spray valve of the spray device to be in a full open status; and if the projected leaf area index is greater than or equal to 0.85 or the normalized difference vegetation index (NDVI) is greater than or equal to 0.75, then the spray control mode will be the full open control mode.

3. The method as claimed in claim 2, wherein the spray control mode includes an open ratio control mode for opening the spray valve to a predetermined open ratio with respect to the full open status of the full open control mode; and if the projected leaf area index smaller than 0.85 or the normalized difference vegetation index (NDVI) smaller than 0.75, the spray control mode will be the open ratio control mode, and the predetermined open ratio is equal to the projected leaf area index divided by 0.85 or the normalized difference vegetation index (NDVI) divided by 0.75.

4. The method as claimed in claim 1, wherein the central control unit controls a short wave light source device of the unmanned aerial vehicle to illuminate each block, so that the multispectral image of each block captured by the multispectral camera includes a fluorescent image, and the central control unit obtains a fluorescence index/intensity according to the captured fluorescent image, and if the fluorescence index/intensity is greater than a predetermined value, then the spray device will be control to spray a water solution, a salt solution, a fertilizer solution, and/or a pesticide solution to the block according to the spray control mode.

5. The method as claimed in claim 4, wherein if the fluorescence index/intensity has a normalized fluorescence index/intensity greater than or equal to 0.3, then the spray device will be controlled to spray a water solution to the block according to the spray control mode.

6. The method as claimed in claim 5, wherein the spray control mode includes a full open control mode for controlling the spray device to be set in a full open status, and if the normalized fluorescence index/intensity is greater than or equal to 0.4, then the spray device will be controlled to spray a water solution to the block according to the spray control mode, and the spray control mode is the full open control mode.

7. The method as claimed in claim 4, wherein the short wave light source device illuminates each block at night.

8. The method as claimed in claim 4, wherein the central control unit bases on the fluorescence index/intensity to determine a water shortage, a fertilizer shortage, a salt shortage, or pest of the plurality of strains of plants, and if the fluorescence index/intensity is greater than or equal to the predetermined value, then the spray device will be controlled to spray a water solution, a salt solution, a fertilizer solution, and/or a pesticide solution to the block according to the spray control mode.

9. The method as claimed in claim 1, wherein the central control unit obtains a temperature value according to the captured multispectral image, and if the temperature value is greater than a predetermined temperature value, then the spray device will spray a water solution to the block according to the spray control mode.

10. The method as claimed in claim 1, wherein the navigation parameters further include a serial number parameter, a speed parameter, a height parameter and an arrival time parameter of each block, and the central control unit controls the unmanned aerial vehicle to fly according to the serial number parameter, the speed parameter, the height parameter and the arrival time parameter.

\* \* \* \* \*